United States Patent Office 3,122,865
   Patented Mar. 3, 1964

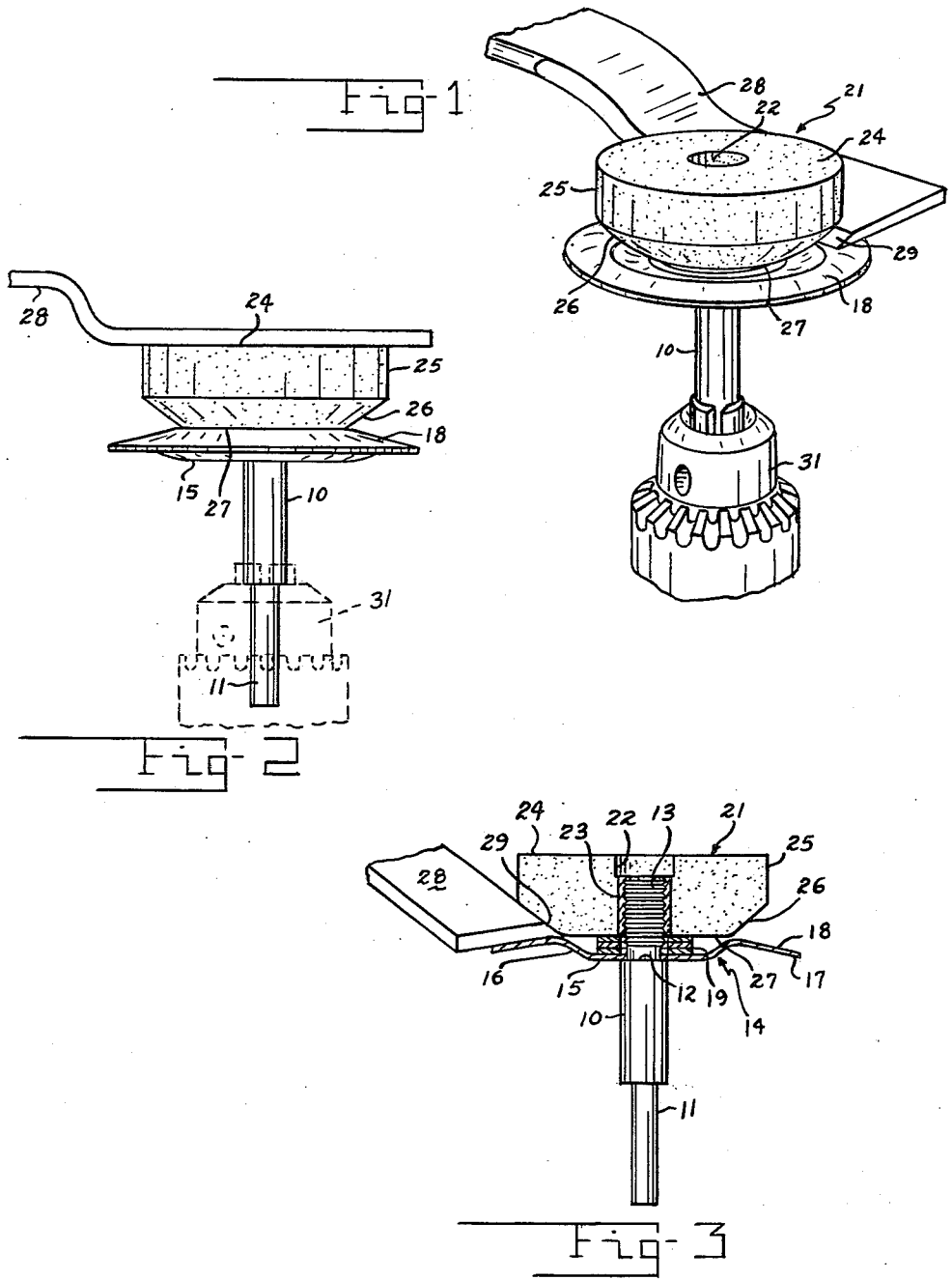

3,122,865
   POWER TOOL ATTACHMENT FOR THE SHARPEN-
   ING OF ROTARY MOWER BLADES
   Henry William Kolling, 1744 Catalpa Drive, Dayton, Ohio
   Filed Sept. 7, 1961, Ser. No. 136,524
   6 Claims. (Cl. 51—173)

This invention relates to grinding tools and particularly to a generally new device of this kind adapted for use as an attachment in power tools and the like to renew and repair the cutting surfaces of rotary lawn mower blades.

The object of the invention is to simplify the construction as well as the means and mode of operation of grinding tools, whereby such tools may not only be economically manufactured, but will be more efficient and satisfactory in use, adaptable to a wide variety of applications, and be unlikely to get out of order.

A further object of the invention is to present a new article of manufacture especially constructed and arranged for the sharpening of the blades of rotary mowers, now common tools in the care of home lawns, which article is adapted for use as an attachment to another relatively common household tool, the hand held electric power drill.

Another object of the invention is to provide for blade sharpening as described without the necessity of removing the blade from the mower or in any manner disassembling the mower.

A further object of the invention is to adapt a grinding implement of the kind described both for sharpening of the cutting edge of the blade and for the removal of nicks, burrs and other deformations on the underside of the blade.

A further object of the invention is to provide for the simple obtaining of a renewed grinding surface on the grinding implement when an initial surface thereof has become worn.

A still further object of the invention is to build into the grinding implement an arrangement of complementary surfaces whereby the implement may readily and without the need of external guides be applied to the blade at a constant, predetermined angle calculated to produce a correctly angled cutting surface on the blade edge.

A further object of the invention is to provide a grinding tool possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a view in perspective of a grinding implement in accordance with the illustrative embodiment of the invention, the implement being shown applied to the edge of the mower blade;

FIG. 2 is a view of the implement of FIG. 1 in side elevation and showing the implement as used in renewing the undersurface of the mower blade; and FIG. 3 is a view in longitudinal section of the grinding implement of FIGS. 1 and 2, showing the manner in which a guide plate forming a part of the implement is used to guide the blade to a correctly angled position relative to the grinding wheel.

Like parts are indicated by similar characters of reference throughout the several views.

Referring to the drawing, and particularly to FIG. 3, a grinding implement in accordance with the illustrated embodiment of the invention comprises a mandrel 10. One end of the mandrel 10 is reduced in diameter to form a shank portion 11 adapted to be received in the chuck of a rotary drill or like power tool. The other end of the mandrel similarly is reduced in diameter and in the process forms on the mandrel, intermediate its ends, a transversely disposed shoulder 12. Beyond the shoulder 12 the reduced diameter portion of the mandrel is externally threaded and may be considered as defining a threaded tip 13.

Fitting relatively closely over the threaded tip 13 but movable bodily longitudinally thereof is a guide plate 14 which limits against or seats on the shoulder 12. Disposed thus in relatively transverse relation to the axis of the mandrel 10 the plate 14 is formed with a shallowly recessed portion 15 at the center thereof which is joined by a connecting portion 16 to an outwardly disposed annular portion 17 which is inclined in such manner as to present a bevel-like surface 18 which tapers toward the axis of the mandrel 10 in the direction of the threaded tip 13.

Also fitted over the threaded tip 13, in following, superposed, relation to the plate 14 is spacer means 19 which in the illustrated instance is comprised of a plurality of separable washers. Overlying the spacer means 19 and guide plate 14 is a grinding wheel 21 having a longitudinal through opening 22 in which is fixed a cylindrical internally threaded nut 23. The latter is adapted for mating reception of the threaded tip 13. Caused to enter one end of the cylindrical nut 23, and rotated therein, the threaded tip 13 advances into and through the nut in a manner to bring the grinding wheel 21 to an assembled position upon the mandrel 10 seated upon the spacer means 19 as indicated. Continued rotary turning motion of the mandrel 10 in the same direction draws the grinding wheel 21 down firmly upon the washer means 19, the entire assembly comprising wheel 21, spacer means 19 and guide plate 14 being thus pressed against shoulder 12 in a manner to create a unitary assembly of these parts with the mandrel 10. The grinding implement so defined accordingly rotates as a unit when turned in a power tool, the direction of such turning being in the same described direction, that is to advance threaded tip 13 into nut 23. In a disassembly of the parts it is merely necessary to hold wheel 21 while effecting a reverse direction of rotation of mandrel 10 whereupon tip 13 is backed out of nut 23 and the parts so separated or released for separation.

At its top, or at what may be considered its outer face, the grinding wheel 21 is formed with a flat planar surface 24. On the side or periphery of the wheel is a cylindrical surface 25 which toward the inner or bottom end of the wheel terminates in a frusto conical or bevel surface 26. The latter ends at the inner face of the wheel in a transverse planar surface 27 which is parallel to the outer face 24 and of a diameter approximately to be received in the recessed portion 15 of the guide plate 14.

The grinding wheel is mounted on the threaded tip 13 with the bevel surface 26 facing downward or in opposing relation to tapering surface 18 on the guide plate 14. These surfaces hence cooperate in defining an annular area of access adapted to receive a blade 28 substantially in the manner indicated in FIG. 3, the grinding implement being applied to the blade or the blade so disposed in such access areas to bring the cutting edge 29 of the blade up against bevel surface 26 of the grinding wheel. Relative rotation of the grinding wheel accordingly sharpens or renews such cutting edge, the inclined character of the surface 26 being adapted approximately to conform to the cutting angle built into the blade edge. The guide plate 14 provides a rest and a guide for assisting in the application of the blade edge to the grinding surface while inclined portion 17 thereof performs a particular function in assuring that the blade edge is presented to the grinding wheel always at the same predetermined angle. In this connection, inclined surface 18 on the guide plate and bevel surface 26 on the grinding wheel have a complementary relation by which they may define between them an angle corresponding approximately to the desired cutting angle on the blade edge. In the illustrated instance the bevel surface 26 is at a 45° angle which is one conveniently formed in the manufacturing process by which the wheel is produced, while surface 18 is at an angle of 15°. Placed in cooperating complementary relation as here done, the two surfaces define an acute angle of approximately 60° which corresponds approximately to the slope on the cutting edge of many mower blades. Accordingly, if the implement is applied to the work in such manner as to place the inclined portion 17 flushly against the underside of the blade a lateral motion bringing the cutting edge 29 of the blade up against surface 26 of the grinding wheel will find the edge 29 correctly held for the best and most efficient renewing of its original surface and with little or no tendency to form burrs and newly angled cutting surfaces.

The bevel surface 26 on the grinding wheel 21 is elongated beyond the length necessary to achieve a cooperative relationship with cutting edge 29 of the blade. In the construction and arrangement of parts as shown in FIG. 3 only the lower part of surface 26 is used. When this portion of the surface becomes worn it is contemplated that the grinding implement may be disassembled, as before described, and the spacer means 19 removed. Then, upon reassembly of the parts the worn lower or inner end of the grinding wheel is received in the recessed portion 15 of the plate 14 while the upper, heretofore unused portion of bevel surface 26 is brought downward to cooperative relationship with the surface 18. A renewed surface of the grinding wheel thus is presented for engagement by the blade edge.

The use of the grinding implement contemplates a series application to the mower blade in the different steps as shown in FIGS. 1 and 2, although either step may be performed to the exclusion of the other. In carrying out the sharpening operation the mower blades are not removed nor is the mower in any way disassembled. The mower is tilted sufficiently to gain access to the underside thereof. Then, with the mandrel 10 installed in a power tool, the implement is applied to the blade, a first step possibly being that shown in FIG. 2, where the flat planar surface 24 of the grinding wheel is brought to bear against the flat underside of the blade in a manner to remove nicks, burrs and other deformations which may be present there. Then, the implement is applied as shown in FIG. 1 which illustrates the edge sharpening operation as shown and discussed in connection with FIG. 3. Thus, the blade is caused laterally to enter the access area between surfaces 18 and 26, and, while the blade edge is being pressed against surface 26, the flat underside of the blade is made to lie against surface 18. The implement thus is positioned for proper renewing of the blade edge and when caused to rotate performs such work.

The connection between the mandrel 10 and the grinding wheel 21 is in the illustrated instance a self-installing and self-removing kind. Other forms of connection are possible, as for example through a nut threaded onto the tip 13 but detachable from the grinding wheel.

The grinding wheel may be any conventional construction offering a degree of cutting efficiency compatible with safety requirements. A coarse grit held together by a vitrified bond has been found to produce satisfactory results.

From the above description it will be apparent that there is thus provided a device of the character described possessing the particular features of advantage before enumerated as desirable, but which obviously is susceptible of modification in its form, proportions, detail construction and arrangements of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A rotary grinding implement, including a mandrel having a reduced diameter at one end, said end being formed as a threaded tip, a guide plate fitted over said reduced diameter end, means providing a seat for said guide plate on said mandrel, said plate having a central recessed area and a radially projected annular surface, the latter surface tapering toward the axis of the mandrel in the direction of said threaded tip, a grinding wheel fitted over said one end of the mandrel in following superposed relation to said guide plate, the periphery of said wheel having a beveled surface tapering toward the axis of the mandrel in the direction of said guide plate, said last mentioned taper terminating adjacent to the inner periphery of the said annular surface on said plate, the said oppositely tapering surfaces on said plate and said wheel defining an angle of predetermined extent, the placing of the blade for sharpening flat on the said annular surface of said plate presenting the blade edge to the bevel surface on said wheel at a correct angle for grinding, spacer means received in the centrally recessed area of said plate holding said grinding wheel positioned as described relative to said plate, said spacer means being variable to admit of a relative telescoping movement of said grinding wheel with respect to the central recessed area of said guide plate, and means utilizing the threaded tip on said mandrel to hold said grinding wheel and said guide plate in a unitary assembled relation on said mandrel.

2. A power tool attachment for the sharpening of rotary mower blades including, a mandrel, a grinding wheel fixed on one end of said mandrel having a portion of its periphery formed as a frusto-conical surface, a guide plate fixed on said mandrel in transverse relation to the longitudinal axis of said mandrel, said guide plate having an annular surface portion positioned in opposed, axially aligned, relatively spaced relation to said frusto-conical surface and inclined therefrom, the inner periphery of said annular surface portion being substantially in line with the peripheral portion of said frusto-conical surface which defines its minimal cross-sectional dimension, said annular surface portion of said guide plate being angled away from said frusto-conical surface to form a reference plane and serve as a base rest for the back of a mower blade to dispose the cutting edge thereof in a predetermined position referenced to said frusto-conical surface.

3. An attachment according to claim 2 characterized by means in connection with said mandrel for providing a variable spacing between said frusto-conical surface and said annular surface portion of said guide plate for selectively shifting the line of application of the cutting edge of a mower blade with reference to said frusto-conical surface.

4. A power tool attachment for the sharpening of rotary mower blades, including a mandrel, a grinding wheel on one end of said mandrel having a flat planar surface outermost thereof for application to the underside of a mower blade to remove deformations and further having on its periphery adjacent its innermost face a frusto-conical surface tapering toward said innermost face in the direction of the other end of the mandrel, a guide plate mounted on said mandrel in a generally transverse relation to its longitudinal axis in a position adjacent and relatively spaced from the innermost face of said grinding wheel, said guide plate having the portion thereof which is radially outermost from said mandrel formed to present a surface adjacent the innermost face of said grinding wheel which tapers toward the longitudinal axis of said mandrel in the direction of the said one end thereof, said tapered portion of the said guide plate providing a rest for the underside of the mower blade to orient the cutting edge thereof in a predetermined attitude referenced to said frusto-conical surface.

5. A power tool attachment according to claim 4, characterized by the central portion of said guide plate about said mandrel being recessed and spacer means in said recess establishing and maintaining a predetermined spaced relation between said grinding wheel and said guide plate, said spacer means being removable from said recess to enable a relative approaching motion of said plate and wheel to compensate for wear.

6. A power tool attachment for the sharpening of rotary mower blades including, a mandrel, a grinding wheel fixed on one end of said mandrel, said wheel having a portion of its periphery formed as a frusto-conical surface, a guide plate confined on said mandrel in transverse relation to its longitudinal axis, said guide plate having an annular surface portion positioned in opposed, axially aligned, relatively spaced relation to said frusto-conical surface, said annular surface portion of said guide plate forming a reference plane, serving as a base rest for the back of a mower blade to dispose the cutting edge thereof in a predetermined position in reference to said frusto-conical surface, said guide plate also having, adjacent the inner peripheral portion of said frusto-conical surface, a centrally recessed area which facilitates a precision grinding of said cutting edge on application to said frusto-conical surface.

References Cited in the file of this patent

UNITED STATES PATENTS

| | | |
|---|---|---|
| 1,388,882 | Paul | Aug. 30, 1921 |
| 1,801,802 | Conyngham | Apr. 21, 1931 |
| 2,232,402 | Norton | Feb. 18, 1941 |
| 2,806,331 | Hoye | Sept. 17, 1957 |
| 2,841,931 | Holzhausen et al. | July 8, 1958 |
| 2,865,148 | Moore | Dec. 23, 1958 |
| 2,993,312 | Holland et al. | July 25, 1961 |
| 3,075,320 | Hernley | Jan. 29, 1963 |